(12) United States Patent  (10) Patent No.: US 8,478,187 B2
Faulkenberry et al.  (45) Date of Patent: Jul. 2, 2013

(54) COMPUTER GENERATED ENVIRONMENT FOR USER ASSESSMENT

(76) Inventors: Ray Faulkenberry, Antioch, CA (US); Jon Klimo, Oakland, CA (US)

(*) Notice: Subject to any disclaimer, the term of this patent is extended or adjusted under 35 U.S.C. 154(b) by 0 days.

(21) Appl. No.: 12/963,442

(22) Filed: Dec. 8, 2010

(65) Prior Publication Data

US 2012/0148998 A1  Jun. 14, 2012

(51) Int. Cl.
*G09B 3/00* (2006.01)

(52) U.S. Cl.
CPC .................................... *G09B 3/00* (2013.01)
USPC ............................................................. 434/362

(58) Field of Classification Search
CPC ........................................................ G09B 3/00
USPC ................... 434/322, 323, 236, 362
See application file for complete search history.

(56) References Cited

U.S. PATENT DOCUMENTS

| | | | |
|---|---|---|---|
| 6,921,336 B1 * | 7/2005 | Best | 463/32 |
| 2003/0008270 A1 * | 1/2003 | Fleishman | 434/322 |
| 2005/0100875 A1 * | 5/2005 | Best et al. | 434/362 |
| 2006/0234201 A1 * | 10/2006 | Pierson et al. | 434/323 |
| 2011/0004481 A1 * | 1/2011 | Jones | 705/1.1 |

* cited by examiner

*Primary Examiner* — Kesha Frisby
(74) *Attorney, Agent, or Firm* — DLC Patents, PLLC; Dustin L. Call (57) ABSTRACT

One example embodiment includes a method for providing an assessment instrument, where the assessment instrument occurs within a computer generated environment. The method includes determining the assessment to be made and determining the types of responses to be elicited. The method also includes providing a computer generated environment designed to elicit the responses.

20 Claims, 7 Drawing Sheets

COMPUTER GENERATED ENVIRONMENT FOR USER ASSESSMENT

CROSS-REFERENCE TO RELATED APPLICATIONS

Not applicable.

BACKGROUND OF THE INVENTION

Assessments and examinations can be made for a variety of reasons. For example, students can take achievement tests to determine whether they have learned the required materials in school or other learning environments. These tests can be used to evaluate the student and to evaluate the effectiveness of a teacher or the learning institution itself. In addition there are other assessments, such as job interviews, psychological assessments and other tests that are encountered frequently throughout our lives.

These assessments all share a few consistent drawbacks. The first is a high degree of user anxiety. That is, the user knows that he/she is being tested which can lead to anxiety. The anxiety, in turn, can skew the results obtained from the assessment. E.g., if a particular group of students is more prone to testing anxiety, then testing of that group may indicate that the group is doing worse than the group is actually doing.

Second, users know that the results are being evaluated. This may encourage the user to respond differently that they would otherwise respond. For example, when first meeting with a counselor a person may try to provide answers to the counselor's questions that they feel the counselor wants to hear, rather than honest answers. I.e., the answers provided by the user may not accurately reflect the mindset of the user, and may instead reflect what the user thinks are the "best" answers to provide to the evaluation.

In addition, many evaluations are done on the basis of the user's answers. Often, these answers are part of a closed set. I.e., the user picks from a pre-determined set of answers provided as part of the assessment. This is often done to allow a portion of the assessment to be done automatically. That is, the user can provide answers that can be evaluated electronically, providing a final result to the assessor. However, answers from an open set of answers often allows for a better assessment. Closed answer sets provide "clues" to the desired answer. If they are not worded carefully they can reflect the assessor's biases and therefore indicate to the user the assessor's preferred answer. In contrast, an open answer set, where the user can provide any answer, is inherently free of assessor bias.

Accordingly, there is a need in the art for an assessment that can reduce or eliminate testing anxiety. Additionally there is a need in the art for an assessment that can reduce or eliminate user responses that attempt to match the user's belief of the assessor's preferred answers. Further, there is a need in the art for an assessment that can provide evaluation of both closed sets and open sets of answers.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for providing an assessment instrument, where the assessment instrument occurs within a computer generated environment. The method includes determining the assessment to be made and determining the types of responses to be elicited. The method also includes providing a computer generated environment designed to elicit the responses.

Another example embodiment includes a method for providing an assessment instrument, where the assessment instrument occurs within a computer generated environment. The method includes determining the assessment to be made, where the assessment includes an evaluation of a user's characteristics, and determining the responses to be elicited from the user, where the responses allow for the assessment to be performed. The method also includes providing a computer generated environment, where the computer generated environment includes situations designed to allow the user to make choices within the computer generated environment, and allowing the user to create a personal avatar, where the personal avatar represents the user within the computer generated environment. The method further includes evaluating the user's choices within the computer generated environment to perform the assessment.

Another example embodiment includes a system embodied on a computer-readable storage medium bearing computer-executable instructions that, when executed by a logic device, carries out a method for providing an assessment instrument, where the assessment occurs within a computer generated environment. The system includes a logic device. The system also includes one or more computer readable media, where the one or more computer readable media contain a set of computer-executable instructions to be executed by the logic device. The set of computer-executable instructions is configured to provide a computer generated environment, where the computer generated environment includes situations designed to allow the user to make choices within the computer generated environment, and allow the user to create a personal avatar, where the personal avatar represents the user within the computer generated environment. The set of computer-executable instructions is also configured to evaluate the user's choices within the computer generated environment to perform the assessment.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
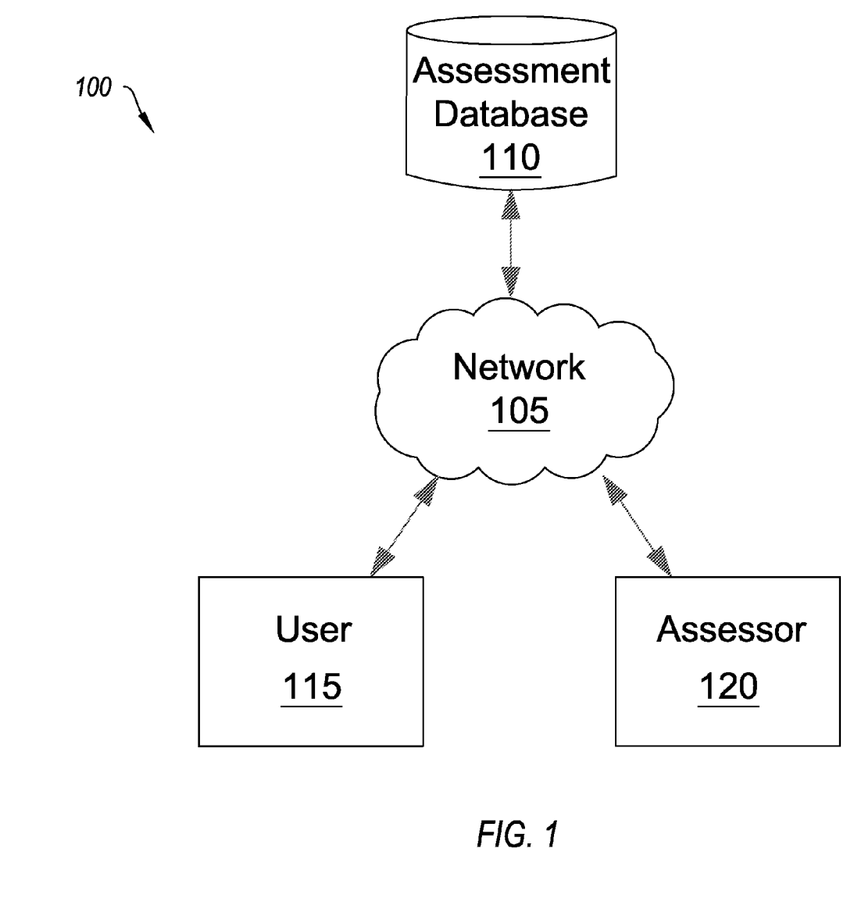
FIG. 1 illustrates a block diagram of a system for allowing an assessment to be performed.

FIG. 1 illustrates a block diagram of a system 100 for allowing an assessment to be performed. In at least one implementation, an assessment includes any evaluation of the user. The system 100 can perform a single assessment or multiple assessments simultaneously. In particular, the system 100 can perform psychological testing, personality testing, behavioral testing, achievement testing, intelligence testing, attitudinal testing or any other user assessment. One of skill in the art will appreciate that there can be overlap among different assessment types. For example, achievement testing and intelligence testing may include significant overlap.

FIG. 1 shows that the system 100 can include a network 105. In at least one implementation, the network 105 can be used to connect the various parts of the system 100 to one another. The network 105 exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

FIG. 1 also shows that the system 100 can include an assessment database 110. In at least one implementation, the assessment database 110 can store one or more assessments to be performed. For example, the assessment database 110 can allow access to download the one or more assessments over the network 105. Additionally or alternatively, the assessment database 110 can be connected to other hardware which is configured to run the one or more assessments which are accessed over the network 105. For example, the assessment database 110 can be connected to one or more microprocessors which are configured to run the one or more assessments and transmit data over the network 105 to one or more individuals to be assessed.

In at least one implementation, the assessment database 110 can be a centralized database on which all assessments are stored. Additionally or alternatively, the assessment database 110 can include different databases, with users connecting to the different databases based on ease of use or user preference. For example, the user can automatically be connected to the nearest database in geographic terms. Additionally or alternatively, the user can select a particular database, in order to connect to a particular assessment application. For example, a user can navigate to web pages associated with the assessment database 110 and download the desired assessments. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified. One of skill in the art will appreciate, however, that any delivery system of the assessment application to the users is within the scope of the invention. Therefore, the delivery method of the assessment application from the assessment database 110 to the users should not be seen as limiting the invention, as described herein, unless otherwise specified in the claims.

FIG. 1 further shows that the system 100 can include a user 115 connected to the network 105. In particular, the network 105 can allow the user 115 to connect to the assessment database 110 over the network 105. In at least one implementation, the user 115 can include any individual who desires to connect to the assessment database 110 over the network 105. In particular, the user 115 can include any individual who is seeking to have an assessment done using an assessment from the assessment database 110 over the network 105.

FIG. 1 also shows that the system 100 can include an assessor 120 connected over the network 105. In at least one implementation, the assessor 120 can include any individual who is evaluating the assessment. For example, the assessor 120 can include a teacher or proctor who is administering an achievement test. Additionally or alternatively, the assessor 120 can include a psychologist, psychiatrist or other therapist who is using the assessment to perform behavioral or psychological testing of the user.

In at least one implementation, the assessor 120 can include a computer program for performing the assessment. I.e. the assessor 120 can include a computer program that at least partially evaluates the choices of the user 115. For example, in an achievement assessment a computer program can parse the response of the user 110 to determine if the user 110 provided the correct response to a particular question. As used in the specification and claims the term choices shall include explicit choices, responses, behaviors or any other evaluatable decision by the user, unless otherwise specified.

In at least one implementation, the user 115 can connect with the assessor 120 over the network 105. That is, the user 115 can communicate with the assessor 120 independent of the assessment. Additionally or alternatively, the user 115 and the assessor 120 can be connected only through the assessment application. That is, communication between the user 115 and the assessor 120 can be limited only to communications allowed by the assessment application.

Figure 2:
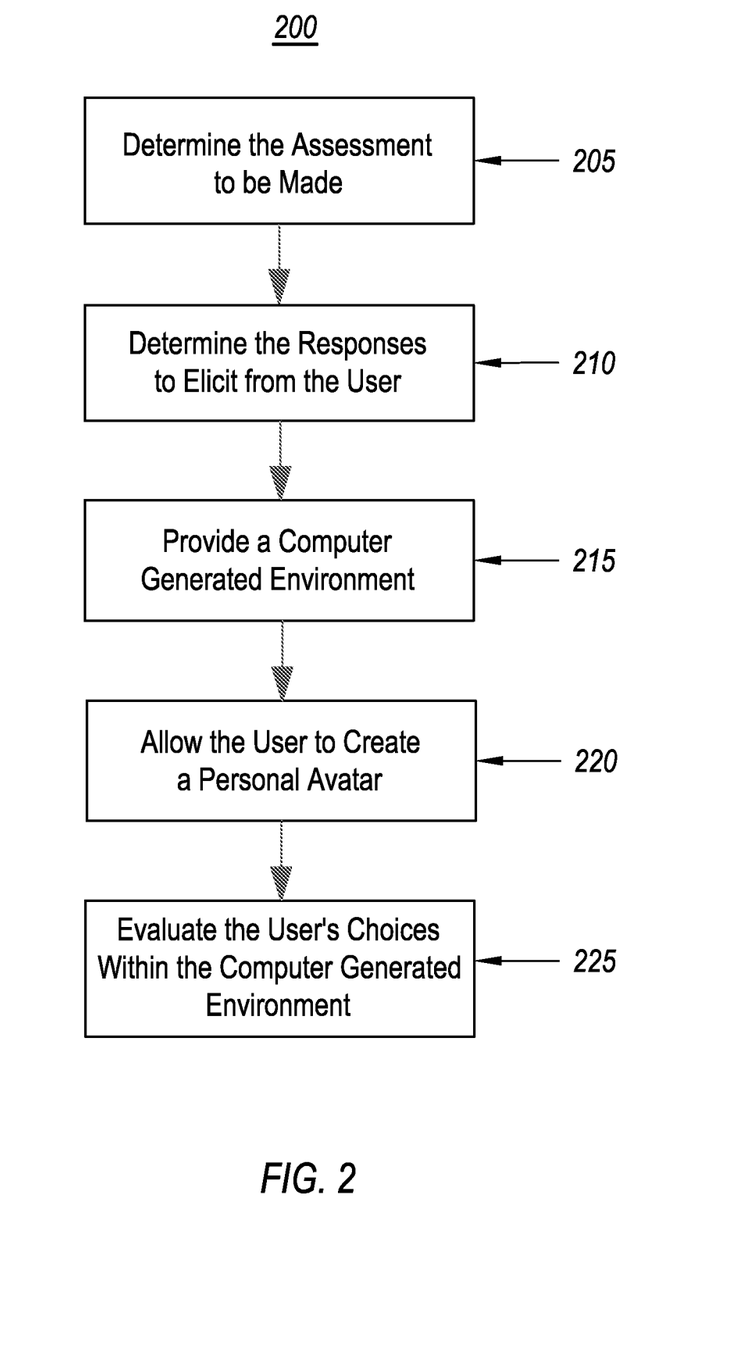
FIG. 2 is a flow chart illustrating a method for producing an assessment application.

FIG. 2 is a flow chart illustrating a method 200 for producing an assessment application. In at least one implementation, the assessment application can perform an assessment of a user. The assessment can be performed within a computer generated environment. The computer generated environment can help remove testing anxiety in the user. In addition, the computer generated environment can produce a better evaluation by eliminating responses that are intended to match those that are desired by the assessor.

FIG. 2 shows that the method 200 can include determining the assessment to be made 205. In at least one implementation, the assessment includes an evaluation of characteristics of the user. In particular, the assessment can include psychological testing, personality testing, behavioral testing, achievement testing, intelligence testing, attitudinal testing or any other user assessment.

In at least one implementation, psychological assessment can include an examination into a user's mental health. For example, a psychological assessment can include an examination by a mental health professional such as a psychologist.

A psychological evaluation may result in a diagnosis or indication of a mental illness. It can be the mental equivalent of physical examination.

In at least one implementation, personality testing can include a test that aims to describe aspects of a user's character that remain stable throughout that person's lifetime. For example, a personality test can seek to describe the individual's character pattern of behavior, thoughts, and feelings. Personality tests can attempt to identify specific characteristics or the personality as a whole.

In at least one implementation, behavioral testing can include testing that attempts to determine an individual's behavioral aspects. I.e., behavioral testing can include an examination that seeks to determine the choices that an individual will make in a particular situation. Additionally or alternatively, behavioral testing can seek to explain why an individual makes the choices that he/she does when confronted with a particular set of circumstances.

In at least one implementation, achievement testing can include education assessment or the process of documenting, usually in measurable terms, knowledge, skills, attitudes and beliefs. Assessment can focus on the individual learner, the learning community (class, workshop, or other organized group of learners), the institution, or the educational system as a whole.

In at least one implementation intelligence testing can include any testing that is intended to measure the capacities for abstract thought, understanding, communication, reasoning, learning, learning from past experiences, planning, and problem solving. For example, intelligence testing can include testing to measure an intelligence quotient or any other measure of intelligence.

In at least one implementation, attitudinal testing can include any testing that is intended to measure the user's attitudes towards a particular topic, object, person or group of people. For example, attitudinal testing can include tests designed to evaluate the differences in political or educational opinions among different groups.

FIG. 2 also shows that the method 200 can also include determining the responses to elicit from the user 210. In at least one implementation, the responses allow for the assessments to be performed. One of skill in the art will appreciate that determining the responses to be elicited from the user 210 does not necessarily mean that a particular response is being sought. Rather, determining the responses to be elicited from the user 210 can also include determining a range of responses that can be provided for the user. For example, the user can select from a closed set of responses. I.e., the user can select from among a set of responses. Additionally or alternatively, the user can select from an open set of responses. I.e., the user can choose any response or can generate, rather than choose, a response, where what is being chosen from by the user in the way of a response comes entirely from within the user and is not already being provided to the user as a response option by the instrument.

In at least one implementation, determining the responses to elicit from the user 210 can include adapting an already existing assessment. For example, an assessment that is typically done by providing a series of questions to a user can be adapted for use in a computer generated environment. I.e., many assessments already exist or will be created and these assessments can be used to determine the responses to elicit from the user 210.

FIG. 2 further shows that the method 200 can include providing a computer generated environment 215. In at least one implementation, the computer generated environment includes situations designed to elicit the desired responses. For example, the computer generated environment can include a scenario where the user is allowed to either help or betray another character to varying degrees. The user's choice within the computer generated environment can then be the user's response for assessment purposes. Additionally or alternatively, the computer generated environment can include questions asked directly to the user.

In at least one implementation, the computer generated environment can include a game. I.e., the computer generated environment can have a primary or secondary purpose of providing enjoyment or amusement for the user. Creating a game within the computer generated environment can increase the spontaneity of the user's choices. Additionally or alternatively, by asking the user to participate in a game, the user's test anxiety can be reduced or eliminated. Further, the user's self-consciousness can often reduce the spontaneity or authenticity of the user's responses. Asking the user to participate in a game can reduce or eliminate this self-consciousness.

In at least one implementation, the user can provide answers through a variety of inputs. For example, the user can use a keyboard, mouse or joystick to control movement within the computer generated environment. Additionally or alternatively, the user can use motion sensors or motion sensitive devices which track the movements of the user to control movement within the computer generated environment.

Additionally or alternatively, the user can be asked to input text or verbal communications. In at least one implementation, the user can type a response into a keyboard. Additionally or alternatively, the user can speak into a microphone which records the user's response. The response can be turned into text using transcription software, saved in audio form or both.

FIG. 2 also shows that the method 200 can include allowing the user to create a personal avatar 220. In at least one implementation, the personal avatar represents the user within the computer generated environment. For example, the user can be asked to design an avatar which looks or acts like the user. Additionally or alternatively, the user can select among a set of pre-created avatars.

FIG. 2 further shows that the method 200 can include evaluating the user's choices within the computer generated environment to perform the assessment 225. In at least one implementation, the user's choices can include responses to scenarios that were created to elicit the responses of the user, as described above. For example, presented with the chance to help or betray another character within the computer generated environment the user may choose to help the character, but only in a minor way. The choice of the user can then be evaluated as part of the assessment. Additionally or alternatively, the way in which the user designs his/her avatar can be evaluated to determine how the user views himself/herself.

In at least one implementation, the user can be allowed to make choices from a closed set. I.e., the user can be forced to choose among a set of pre-determined responses. For example, confronted with a situation in which a character within the computer generated environment has been wounded, the user can be allowed to choose to help or hurt in certain ways. E.g., the user can be asked to choose one of: 1) help and protect the other character (i.e., provide a high degree of help); 2) leave resources for the other character (i.e., provide a low degree of help); 3) leave and ignore the other character (i.e., neither help nor hurt the other character); 4) take resources from the other character (i.e., provide a low degree of hurt; or 5) beat-up or kill the other character (i.e., provide a high degree of hurt).

Additionally or alternatively, the user can be allowed to make choices from an open set. I.e., the user can be allowed to choose any response. For example, the user can be confronted with a situation without defined responses from which the user can choose and allowed to do anything within the computer generated environment. E.g., the user can be asked a question and allowed to provide an answer. The answer can then be parsed either electronically or by an assessor.

In at least one implementation, the choices of the user can be converted to more conventional measurement types. For example, the choices of the user can be correlated to a Likert scale. A Likert scale is a statement which the respondent is asked to evaluate according to any kind of subjective or objective criteria; generally the level of agreement or disagreement is measured. Often five ordered response levels are used, although seven or nine levels can be used.

One of skill in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
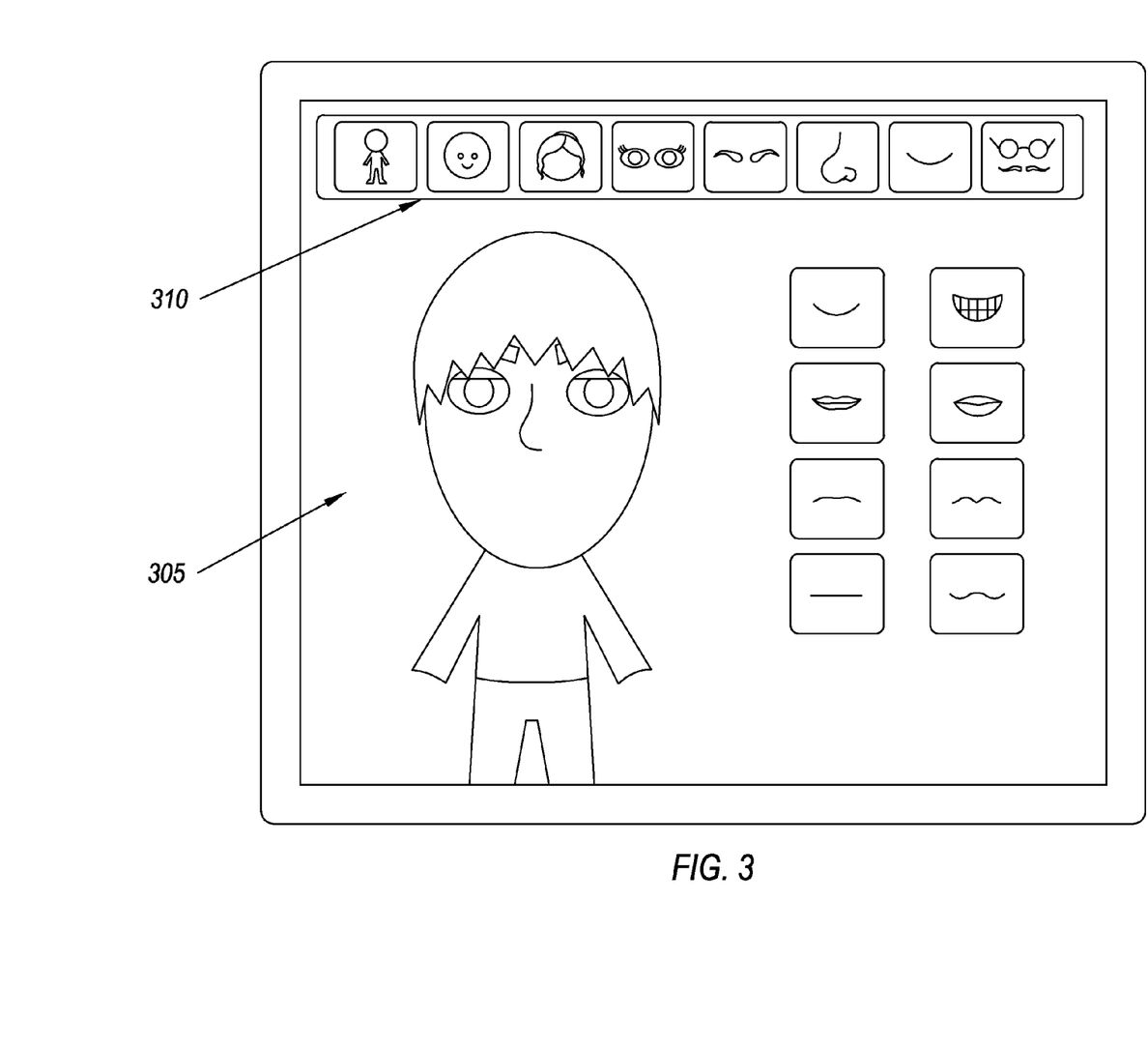
FIG. 3 illustrates an example of allowing a user to create a personal avatar.

FIG. 3 illustrates an example of allowing a user to create a personal avatar 305. In at least one implementation, the personal avatar 305 can be used to represent the user within the computer generated environment. In particular, the user can interact within the computer generated environment via the personal avatar 305.

FIG. 3 shows that the user can be allowed to choose the physical characteristics 310 of the personal avatar 305. In at least one implementation, the physical characteristics 310 of the personal avatar 305 can include the physical appearance of the personal avatar 305. For example, the user can be asked to create the facial features of the personal avatar 305. The user can then select the facial features desired for the personal avatar 305.

Additionally or alternatively, the user can be allowed to choose the behavioral characteristics of the personal avatar 305. In at least one implementation, the behavioral characteristics of the personal avatar 305 can include the way in which the personal avatar 305 acts within the computer generated environment. For example, the user can be allowed to choose the level of compassion shown by the personal avatar 305 while in the computer generated environment.

In at least one implementation, the user can be asked to create a personal avatar 305 as part of the assessment rather than as part of interacting with the assessment instrument. For example, the user can be asked to create a personal avatar 305 that looks like the user. The user can select physical characteristics that are analogous to the user's own physical characteristics. The personal avatar 305 can then be evaluated to determine how the user views himself/herself.

Figure 4:
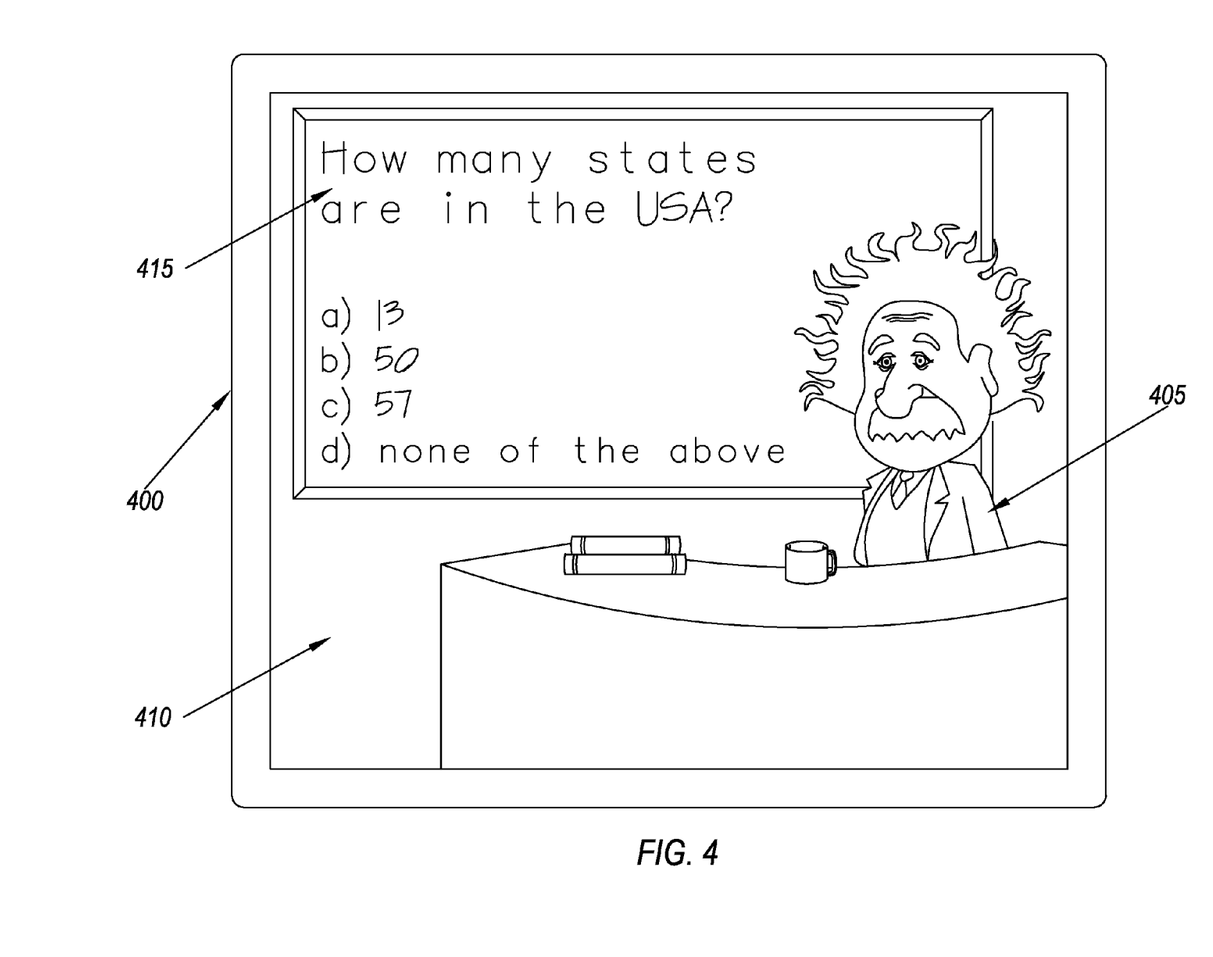
FIG. 4 illustrates an example of a computer generated environment.

FIG. 4 illustrates an example of a computer generated environment 400. In at least one implementation, the computer generated environment 400 can be used to provide an assessment of a user. One of skill in the art will appreciate that the computer generated environment 400 can be used with the system 100 of FIG. 1; however, the computer generated environment 400 can be used with a system other than the system 100 of FIG. 1.

FIG. 4 shows that the computer generated environment 400 can include an assessor avatar 405. In at least one implementation, the assessor avatar 405 can be provided to guide the user through the computer generated environment 400. Additionally or alternatively, the assessor avatar 405 can present questions and/or choices for the user as the user navigates the computer generated environment.

In at least one implementation, the user can create the assessor avatar 405. In particular, the user can choose among physical and behavioral characteristics for the assessor avatar 405 in a similar manner to the process described above with respect to a personal avatar 305 in FIG. 3. Additionally or alternatively, the user can be allowed to choose from among a set of pre-configured assessor avatars 405.

In at least one implementation, the choices of the user regarding the assessor avatar 405 can be used as part of the assessment. For example, if the user is allowed to choose among assessor avatars representing Albert Einstein, George Washington, Genghis Kahn or Julius Caesar, the choice of the assessor avatar 405 can be evaluated as part of the assessment.

FIG. 4 also shows that the computer generated environment 400 can include a background 410. In at least one implementation, the background 400 can be the same for all users. Additionally or alternatively, the user can be allowed to choose a background 400. In at least one implementation, the choices of the user regarding the background 410 can be used as part of the assessment.

FIG. 4 further shows that the computer generated environment can include choices 415 for the user. In at least one implementation, the choices 415 can include direct questions for the user. Additionally or alternatively, the choices 415 can include decisions about how to act within the computer generated environment 400.

Figure 5:
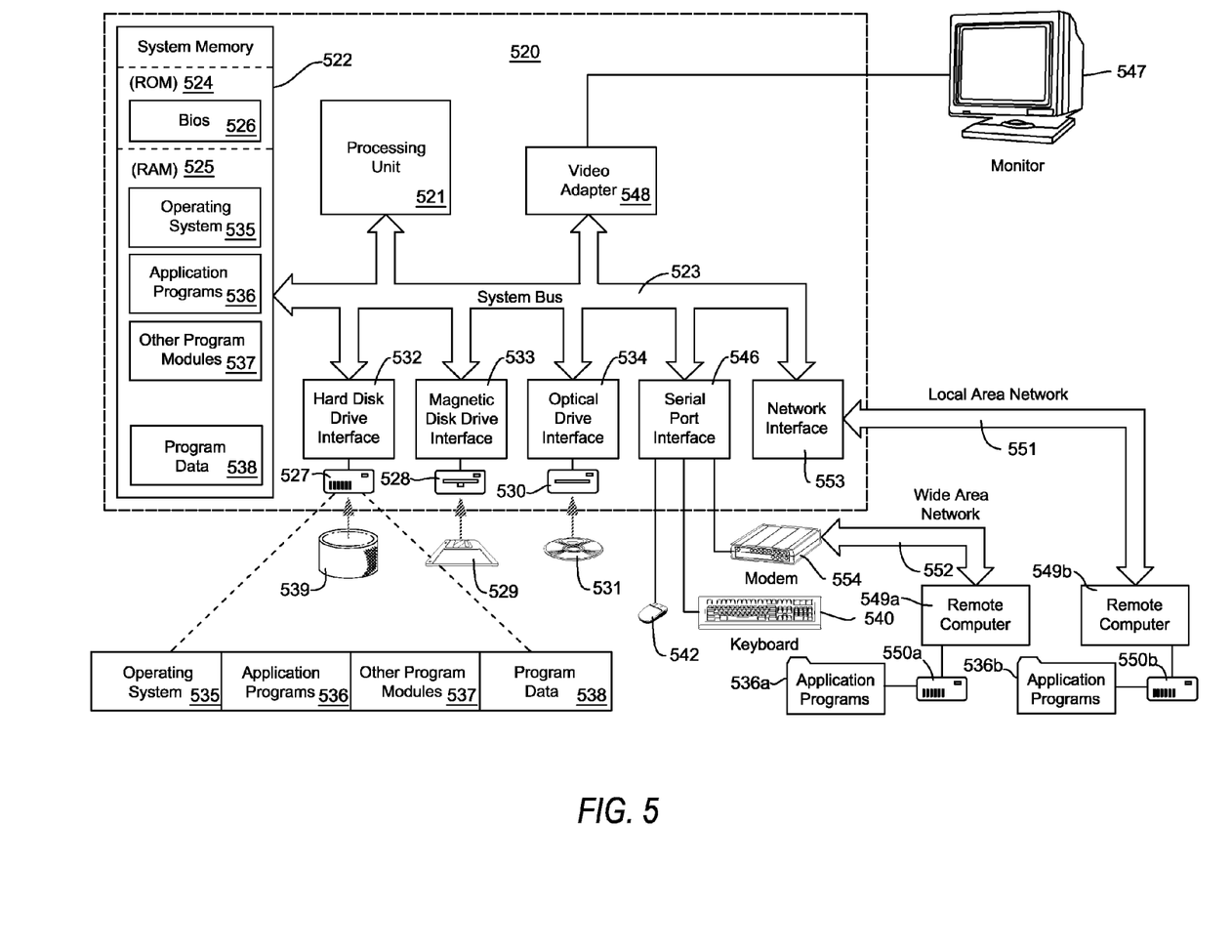
FIG. 5 illustrates an example of a suitable computing environment in which the invention may be implemented.
Figure 6:
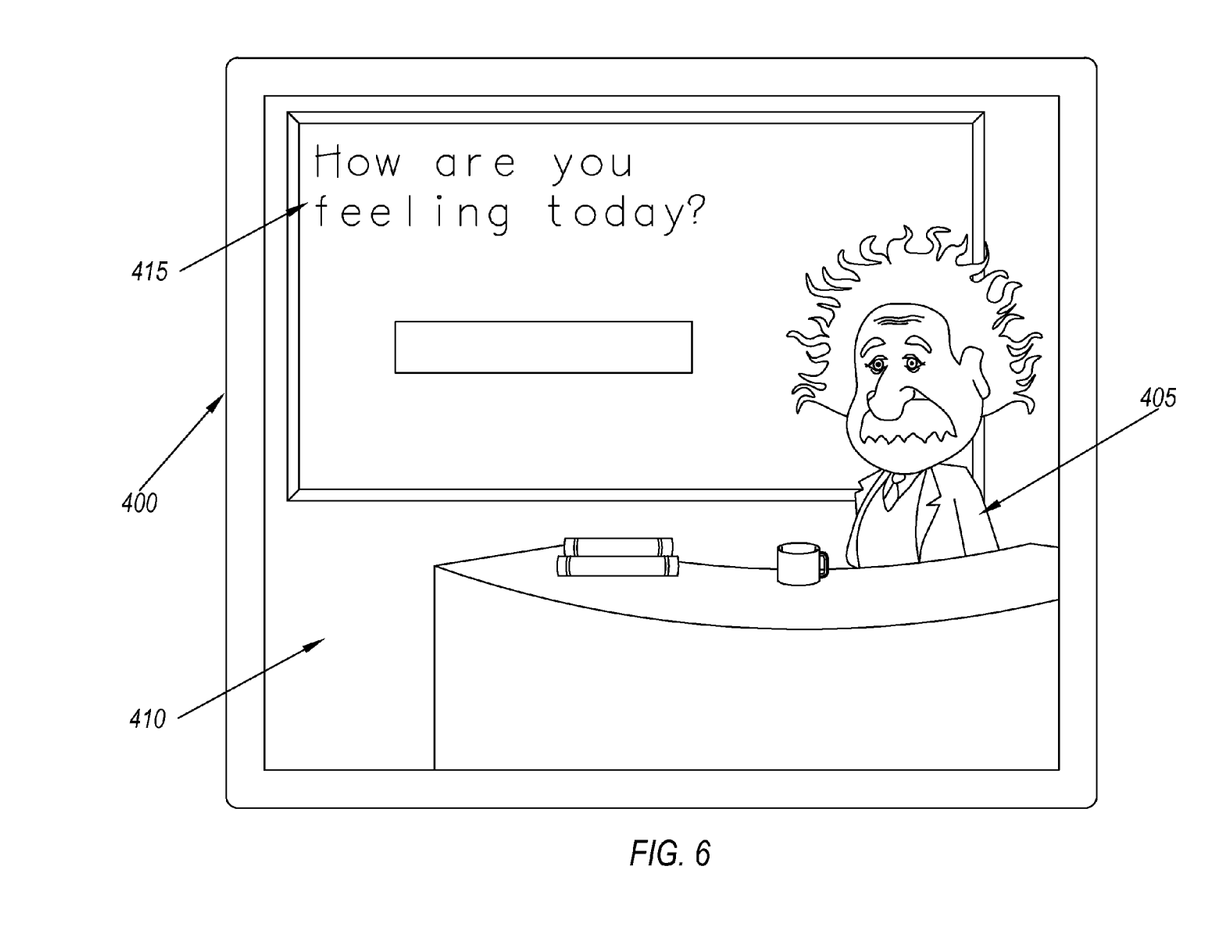
FIG. 6 illustrates an example of an open set of choices.
Figure 7:
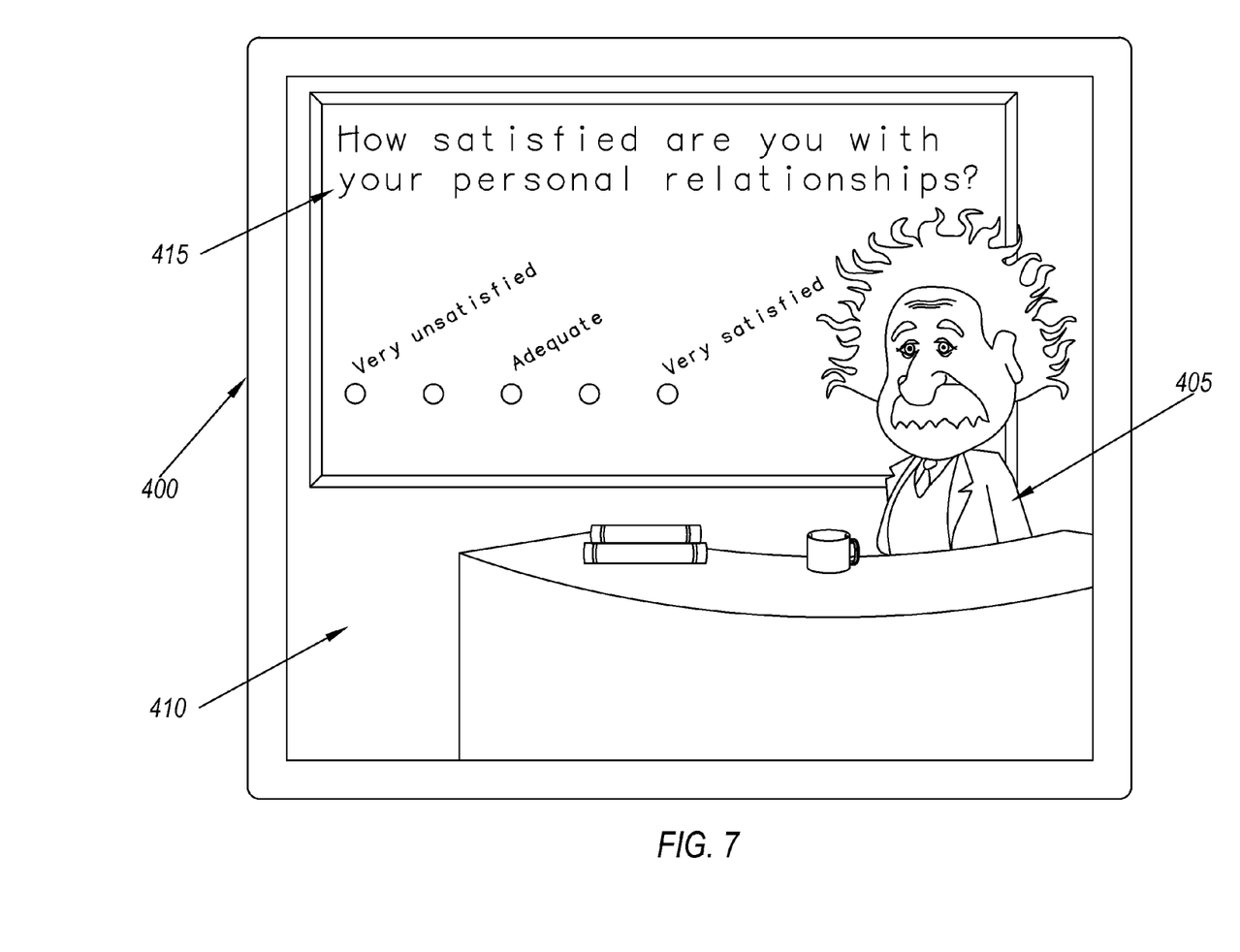
FIG. 7 illustrates an example of a Likert scale.

FIG. 5, and the following discussion, are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an example system for implementing the invention includes a general purpose computing device in the form of a conventional computer 520, including a processing unit 521, a system memory 522, and a system bus 523 that couples various system components including the system memory 522 to the processing unit 521. It should be noted however, that as mobile phones become more sophisticated, mobile phones are beginning to incorporate many of the components illustrated for conventional computer 520. Accordingly, with relatively minor adjustments, mostly with respect to input/output devices, the description of conventional computer 520 applies equally to mobile phones. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, motion detectors or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 can be connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing an assessment instrument, wherein the assessment instrument occurs within a computer generated environment, the method comprising:
   determining an assessment to be made;
   determining a type of response to be elicited for the assessment;
   providing a computer generated environment designed to elicit the responses from a user wherein the computer generated environment includes:
      a game, wherein the user's choices within the game allow for the responses to be elicited; and
      allowing the user to select one or more characters within the computer generated environment;
   evaluating the user's choice in selecting one or more characters within the computer generated environment; and
   providing a computer system, wherein the computer system:
      includes a logic device;
      is configured to present the computer generated environment to the user.

2. The method of claim 1, wherein the assessment to be made includes one of:
   psychological testing;
   personality testing;
   behavioral testing;
   achievement testing;
   intelligence testing; or
   attitudinal testing.

3. The method of claim 1, wherein the computer generated environment allows the user to make choices.

4. The method of claim 3, wherein the user can select from a closed set of choices.

5. The method of claim 3, wherein the user can select from an open set of choices.

6. The method of claim 3 further comprising evaluating the user's choices within the computer generated environment to perform the assessment.

7. The method of claim 1, wherein the assessment to be made includes rating one or more choices on a Likert scale.

8. The method of claim 1 further comprising:
   presenting the user's choices to an assessor.

9. A method for providing an assessment instrument, wherein the assessment instrument occurs within a computer generated environment, the method comprising:
   determining an assessment to be made;

determining a type of response to be elicited for the assessment;
providing a computer generated environment designed to elicit the responses from a user wherein the computer generated environment includes:
  a game, wherein:
    the user's choices within the game allow for the responses to be elicited; and
    allowing the user to select a personal avatar within the computer generated environment;
evaluating the user's choice in selecting a personal avatar within the computer generated environment; and
providing a computer system, wherein the computer system:
  includes a logic device;
  is configured:
    to present the computer generated environment to the user; and
    to evaluate the responses elicited from the user.

10. The method of claim 8 further comprising:
allowing the user to create an assessor avatar; and
evaluating the user's choices in creating the assessor avatar.

11. The method of claim 8, wherein evaluating the user's choices within the computer generated environment includes evaluating the user's responses to a situation provided in the computer generated environment.

12. The method of claim 8, wherein the user is allowed to select characteristics of the computer generated environment.

13. The method of claim 8, wherein allowing a user to create a personal avatar includes allowing the user to select the physical characteristics of the personal avatar.

14. The method of claim 8, wherein allowing a user to create a personal avatar includes allowing the user to select the behavioral characteristics of the assessor personal avatar.

15. A method for providing an assessment instrument, wherein the assessment instrument occurs within a computer generated environment, the method comprising:
determining an assessment to be made;
determining a type of response to be elicited for the assessment;
providing a computer generated environment designed to elicit the responses from a user wherein the computer generated environment includes:
  a game, wherein:
    the user's choices within the game allow for the responses to be elicited; and
    allowing the user to select a personal avatar within the computer generated environment, wherein the personal avatar:
      is controlled by the user; and
      makes choices within the game;
evaluating the user's choice in selecting a personal avatar within the computer generated environment; and
providing a computer system, wherein the computer system:
  includes a logic device;
  is configured:
    to present the computer generated environment to the user; and
    evaluate the responses elicited from the user.

16. The method of claim 14 further comprising:
allowing the user to create an assessor avatar.

17. The method of claim 15, wherein allowing the user to create an assessor avatar includes allowing the user to select the physical characteristics of the assessor avatar.

18. The method of claim 15, wherein allowing the user to create an assessor avatar includes allowing the user to select the behavioral characteristics of the assessor avatar.

19. The method of claim 15, wherein evaluating the user's choices within the computer generated environment includes evaluating the user's choices in creating the assessor avatar.

20. The method of claim 14 further comprising:
allowing the user to select from a set of pre-formed assessor avatars.

* * * * *